(12) United States Patent
Hackett

(10) Patent No.: US 9,169,137 B1
(45) Date of Patent: Oct. 27, 2015

(54) WATER FILTERING SYSTEM AND METHOD

(71) Applicant: Richard Ray Hackett, Washburn, MO (US)

(72) Inventor: Richard Ray Hackett, Washburn, MO (US)

( * ) Notice: Subject to any disclaimer, the term of this patent is extended or adjusted under 35 U.S.C. 154(b) by 0 days.

(21) Appl. No.: 14/488,931

(22) Filed: Sep. 17, 2014

(51) Int. Cl.
  *C02F 1/28* (2006.01)
  *C02F 1/46* (2006.01)
  *C02F 1/461* (2006.01)

(52) U.S. Cl.
  CPC .............. *C02F 1/46104* (2013.01); *C02F 1/283* (2013.01); *C02F 2201/461* (2013.01); *C02F 2201/4611* (2013.01)

(58) Field of Classification Search
  USPC .......................................... 210/660, 694, 205
  See application file for complete search history.

(56) References Cited

U.S. PATENT DOCUMENTS

| 5,149,437 | A | * | 9/1992 | Wilkinson et al. ............. 210/665 |
| 5,314,623 | A | * | 5/1994 | Heskett ......................... 210/638 |
| 6,042,701 | A | * | 3/2000 | Lichtwardt et al. ......... 204/229.6 |
| 2010/0307335 | A1 | * | 12/2010 | Hayward .......................... 95/95 |

FOREIGN PATENT DOCUMENTS

FR          2877332 A1 *  5/2006

* cited by examiner

*Primary Examiner* — Chester Barry

(57) ABSTRACT

A filtering system with electrolytic action and method is disclosed which is adapted for filtering the water in swimming pools, spas, saunas, hot tubs, whirlpools and the like with circulatory flow or single-flow. The filtering system may include a pump for drawing water from a body of water and circulating this water through an electrolytic filter including a layer of electrolytic filter media of dissimilar metal particles or granules and returning this filtered water to the body of water. The filtering system not only removes sand and sediment but also prevents algae and fungus growth, kills bacteria, and eliminates the need for adding chlorine, bromine, and algaecide to the water.

20 Claims, 4 Drawing Sheets

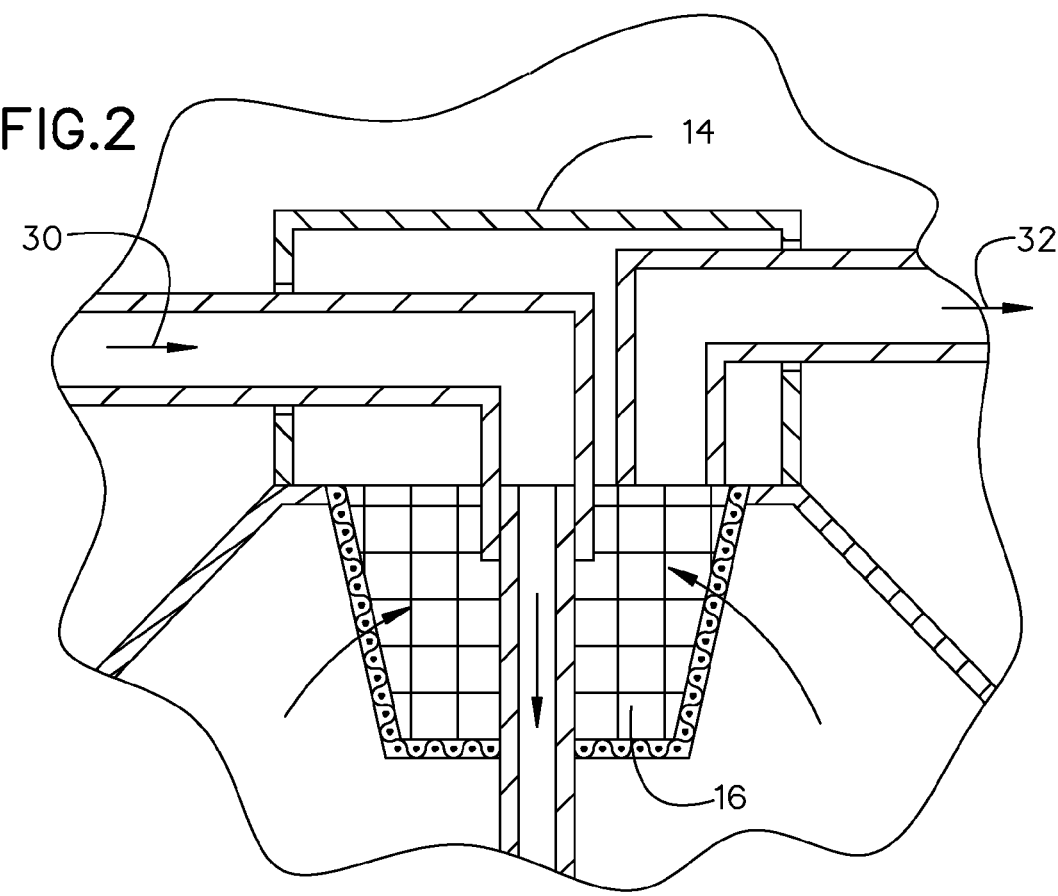
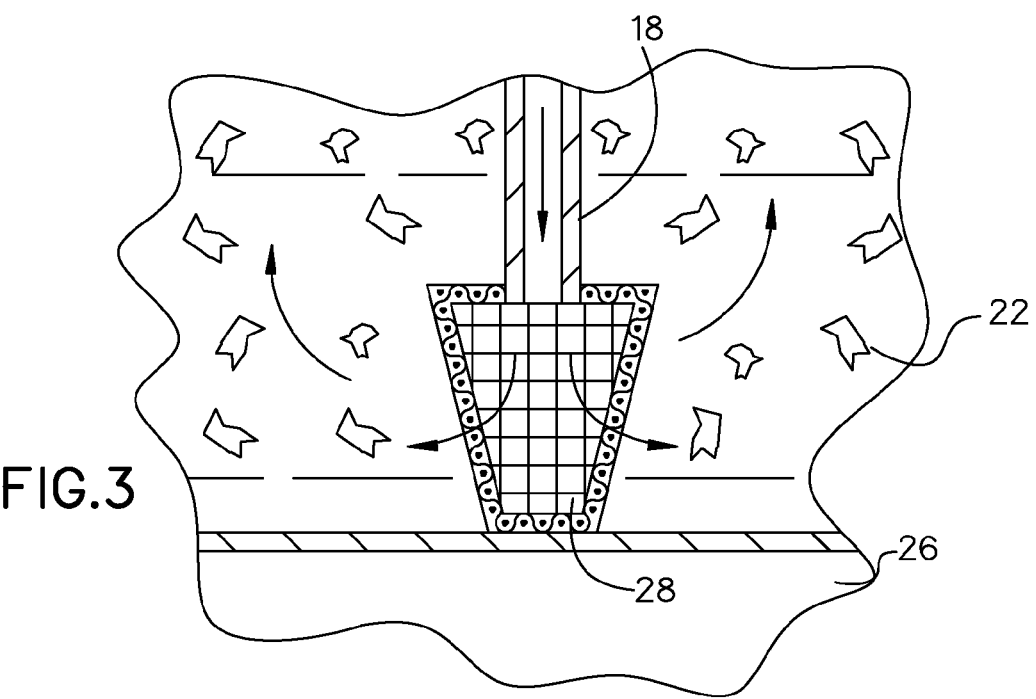

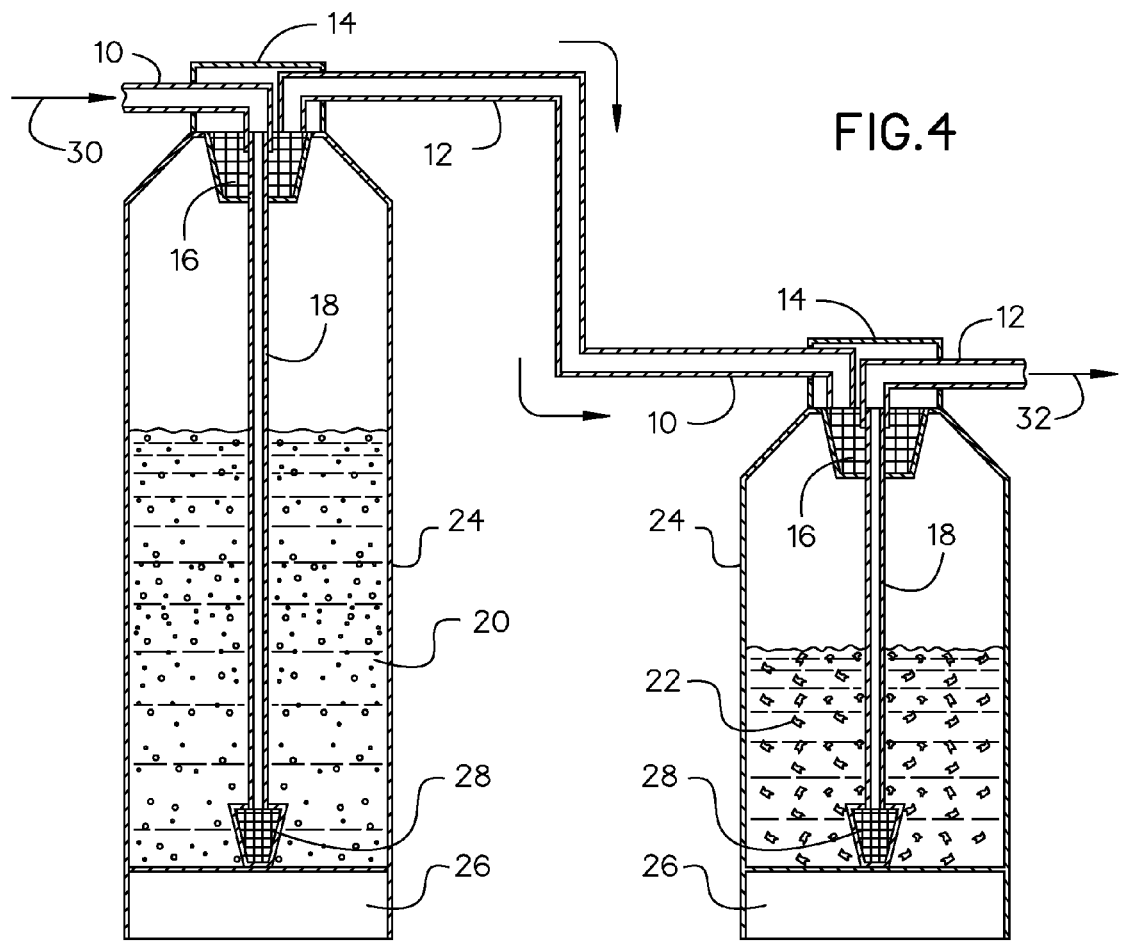
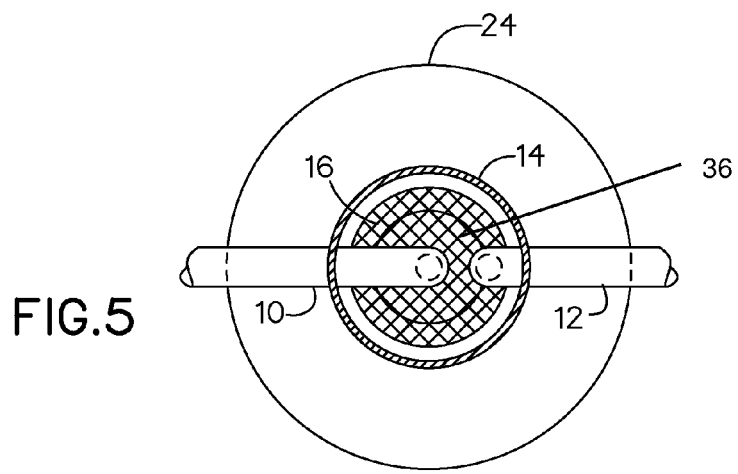

WATER FILTERING SYSTEM AND METHOD

BACKGROUND OF THE INVENTION

The present invention relates to filter systems and, more particularly, to an electrolytic-based water filtering system that eliminates bacteria, fungi and algae without the use of chemicals.

Chlorine, bromine, algaecides and other chemicals commonly used to control bacteria, fungi, algae and otherwise purify water can be hazardous to humans. So why do we introduce such hazards into our swimming pools, spas, saunas, hot tubs, whirlpools and the like?

As can be seen, there is a need for a water filtering system that eliminates bacteria, fungi and algae without the use of chemicals.

SUMMARY OF THE INVENTION

In one aspect of the present invention, a water filter system comprises: a first tank forming a cavity for receiving a fluid and at least one filter material, wherein the first tank further comprises: an intake opening configured for delivering an intake flow to the cavity; and an outtake opening configured for receiving the intake flow from the cavity, wherein the at least one filter material comprises an electrolytic layer disposed between the intake opening and the outtake opening.

In another aspect of the present invention, a water filter system comprises: a first tank and a second tank, each forming a cavity for receiving a fluid and at least one filter material, wherein each tank further comprises: an intake opening configured for delivering an intake flow to the cavity; and an outtake opening configured for receiving the intake flow from the cavity, wherein the at least one filter material received within the first tank comprises an electrolytic layer disposed between the intake opening and the outtake opening; wherein the at least one filter material received within the second tank comprises a carbon layer disposed between the intake opening and the outtake opening; and wherein the intake opening of the second tank is operably connected to the outtake opening of the first tank.

In yet another aspect of the present invention, a method of filtering the water from a water source, comprises the steps of: providing a first tank forming a cavity for receiving a fluid and at least one filter material, wherein the first tank further comprises: an intake opening configured for delivering an intake flow to the cavity; and an outtake opening configured for receiving the intake flow from the cavity, wherein the at least one filter material comprises an electrolytic layer disposed between the intake opening and the outtake opening; interconnecting a pump between the water source and the intake opening; and operating the pump so as to urge an intake flow from the water source to the intake opening.

These and other features, aspects and advantages of the present invention will become better understood with reference to the following drawings, description and claims.

BRIEF DESCRIPTION OF THE DRAWINGS

FIG. 2 is a detailed view of an exemplary embodiment of the present invention;

FIG. 3 is a detailed view of an exemplary embodiment of the present invention;

FIG. 4 is a section view of an exemplary embodiment of the present invention;

FIG. 5 is a top view of an exemplary embodiment of the present invention;

DETAILED DESCRIPTION OF THE INVENTION

Figure 1:
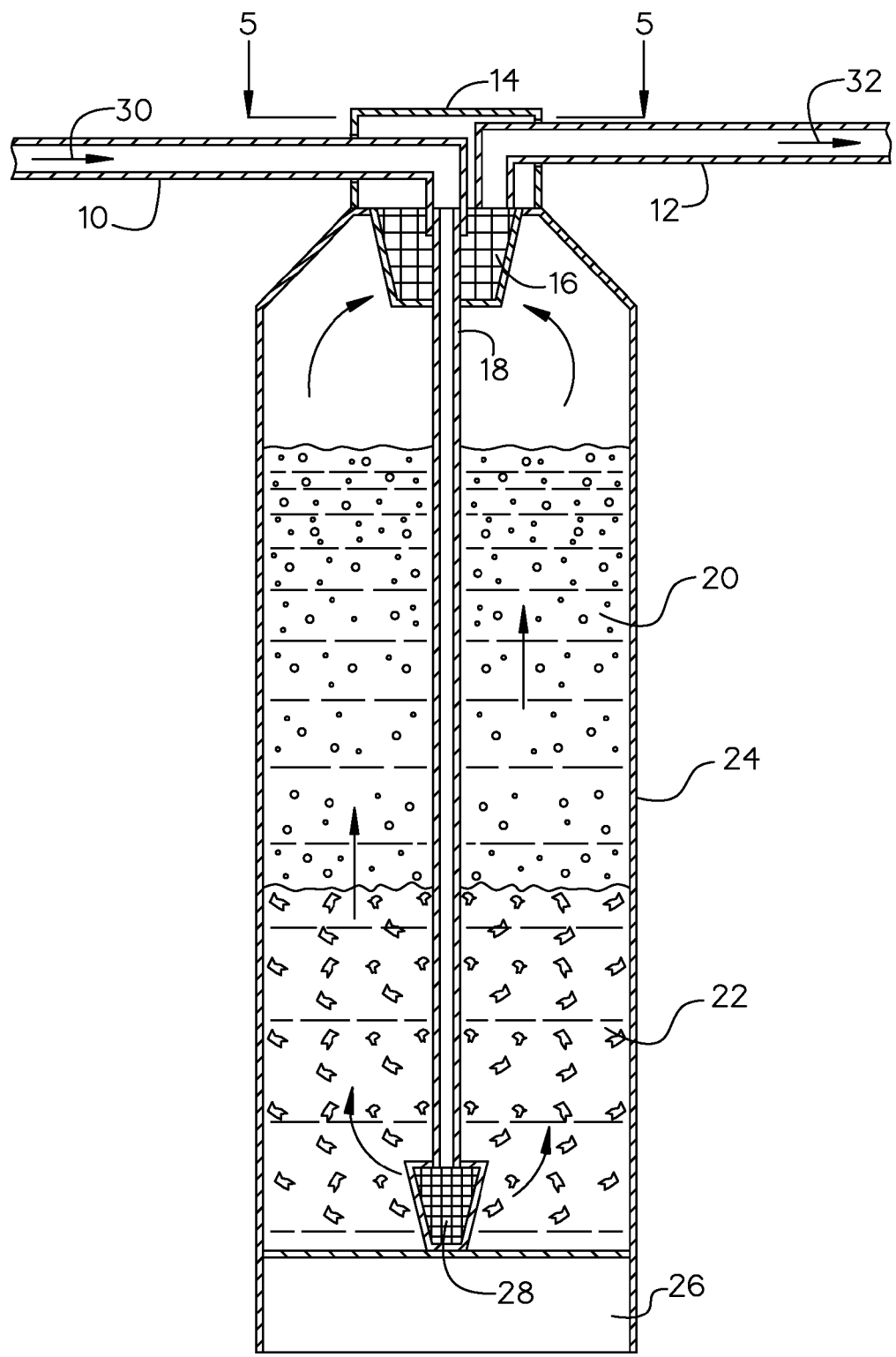
FIG. 1 is a section view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a filtering system with electrolytic action and method is disclosed which is adapted for filtering the water in swimming pools, spas, saunas, hot tubs, whirlpools and the like with circulatory flow or single-flow. The filtering system may include a pump for drawing water from a body of water and circulating this water through an electrolytic filter including a layer of electrolytic filter media of dissimilar metal particles or granules and returning this filtered water to the body of water. The filtering system not only removes sand and sediment but also prevents algae and fungus growth, kills bacteria, and eliminates the need for adding chlorine, bromine, and algaecide to the water.

Referring to FIGS. 1 through 9, the present invention may include a filter system 100 providing at least one elongated tank 24 forming a cavity for receiving a fluid and at least one filter material. The fluid may be, but not limited to, water for drinking, water for swimming, water for waste removal and the like. The filtering system 100 may be connected downstream of a pump, within a larger system, wherein the pump provides the power for sustaining the intake and outtake flow 30, 32, as illustrated in FIGS. 6 through 9. The larger filtering systems may include single-flow or circulatory applications.

Each elongated tank 24 may comprise an intake opening 28 and an outtake opening 16 interconnected by the at least one filter material. Each elongated tank 24 may receive an intake flow 30 of the pumped fluid from an inlet 10 connecting to the intake opening 28 so that the intake flow 30 may be pumped through the at least one filter material, toward and through the outtake opening 16, and resulting in an outtake flow 32.

The intake opening 28 and the outtake opening 16 may include a screen filter 16 for selectively covering the openings 28, 16. The screen filters may be adapted and sized to remove particles of a predetermined size from the flowing fluid. The openings 28, 16 may each provide a sealed chamber 14 so as to prevent external gases and fluids from entering the cavity yet providing an outlet 12 for transmitting the outtake flow 32 from the tank 24.

The at least one filter material may include a plurality of layers. The plurality of layers may include a layer of dissimilar metal particle granules 20 and/or a layer of activated carbon granules 22. In certain embodiments, the layers 20, 24 may be stratified within one tank 24, as illustrated in FIG. 1. In an alternative embodiment, the layers 20, 24 may be disposed in separate tanks 24, as illustrated in FIG. 4. The layer of activated carbon granules 22 may be adapted to absorb a plurality of different chemicals from the intake flow 30. The layer of dissimilar metal particles granules 20 may include, but not be limited to, copper and zinc granules mixed together for facilitating "electrolytic action" involving the process of electrolysis. A preferable ratio may be 55% copper to 45% zinc. Other applications may include varying shapes and sized of tanks and various configurations and ratios of layers 20, 24 being mindful the amount the of dissimilar metal particles granules 20 is a function of the amount of intake flow 30, size of the tank 24 and the desired contact time of the intake flow 30 and the at least one filtering materials. Herein, the layer of dissimilar metal particles granules 20 may be referred to as the electrolytic layer 20, and any container or tank 24 retaining the electrolytic layer 20 may be referred to as the electrolytic filter.

In certain embodiments, the elongated tank 24 may be disposed with a vertically orientation so that a base end 26 is substantially the lowest point relative to gravity and may provide a supporting surface for the remainder of the tank 24, as illustrated in FIG. 1. Preferably the intake flow 30 is configured to be received into the tank 24 from near the base end 26 of the cavity. In such an embodiment, the inlet 10 extends substantially into the cavity, by for example a stand pipe 18, terminating at the intake opening 28 near the base end 26, as illustrated generally in FIG. 1 and in detail in FIG. 3. Such an intake flow configuration prevents packing of the at least one filter material from the downwardly pressure of the intake flow 30 because the intake flow 30 is designed to flow upwardly or at an upward angle against gravity so as to displace at least one filter material and avoid packing and or clogging.

In another embodiment, the intake flow 30 may be received into the tank 24 from an end opposing the base end 26. In such an embodiment, the stand pipe 18 may be mounted to and extend downwardly from the outlet 12 so that the outtake flow 32 initiates near the base end 26, as illustrated in FIG. 4.

In an alternative embodiment, the filtering system 100 may include a plurality of tanks 24 in series, as illustrated in FIG. 4, where the filter material may be configured differently in each tank 24, including a configuration where one tank 24 contains the electrolytic layer 20 and a separate tank 24 contains the carbon layer 22. It is to be understood that any sequence of first the electrolytic layer 20 followed by the carbon layer 22 or alternatively first the layer 22 followed by the electrolytic layer 20 may work. Using the carbon layer 22 with the electrolytic layer 20 enhances the purifying of contaminated water by taking out other chemicals that are known to water, Chlorine, PCB's, Xylene, and so many more. The three materials; copper, zinc and activated carbon will kill *E coli* and coliform.

In alternative embodiments, the filter material may not be restricted to an elongated tank 24; rather, various container shapes and sizes may be used to retain the at least one filter material.

Figure 6:
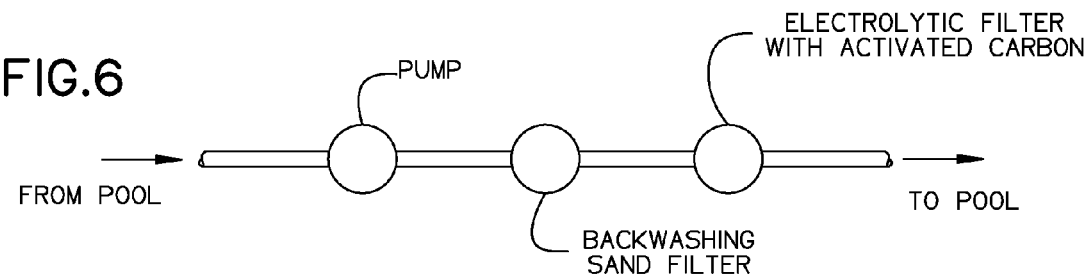
FIG. 6 is a schematic view of an exemplary embodiment of a circulatory system of the present invention.
Figure 7:
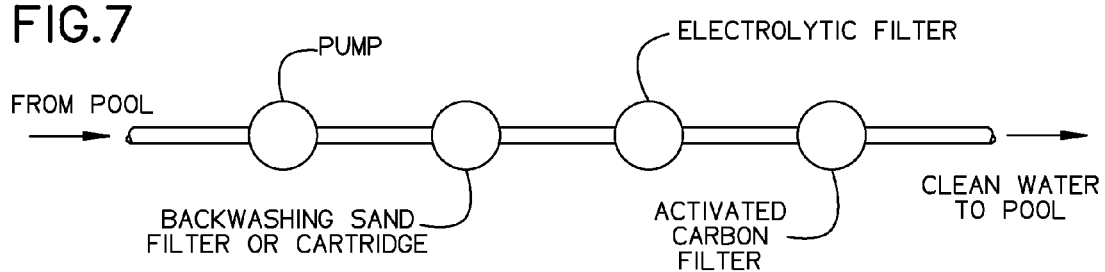
FIG. 7 is a schematic view of an exemplary embodiment of the circulatory system of the present invention the circulatory system.
Figure 8:
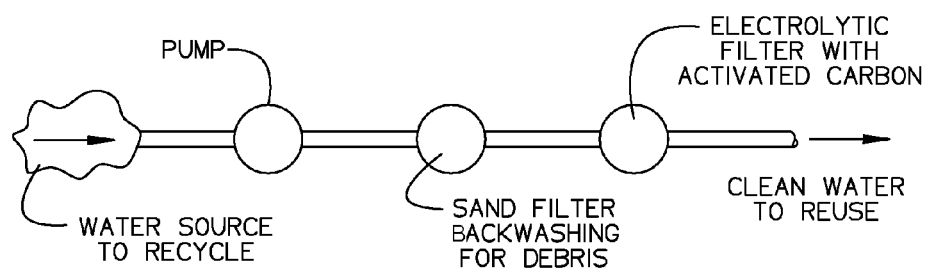
FIG. 8 is a schematic view of an exemplary embodiment of a single-flow system application of the present invention.
Figure 9:
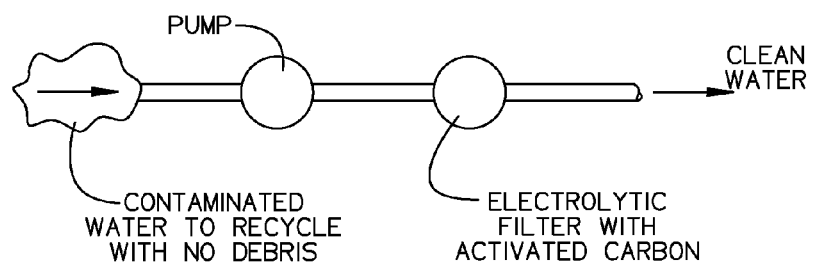
FIG. 9 is a schematic view of an exemplary embodiment of the single-flow system application of the present invention.

A method of using the present invention may include the following. The filtering system 100 disclosed above may be provided. The user may operably connect the filtering system 100 downstream of an in-series pump, as illustrated in FIGS. 6 through 9. The user may interconnect the pump and the filtering system 100 with a backwashing sand filter or cartridge, as illustrated in FIGS. 6 and 7. The user may interconnect the pump and the filtering system 100 with a sand filter backwashing for debris, as illustrated in FIG. 8. As mentioned above, the electrolytic layer 20 and the carbon layer 24 may be retained in separate tanks 24 as illustrated in FIG. 7.

In accordance with a preferred embodiment, the filtering system 100 includes a bypass valve installed downstream of the pump to divert only a selected quantity of water through the electrolytic filter. The filtering system 100 may include a conventional backwashing filter unit upstream of the electrolytic filter to prolong the useful life of the electrolytic layer 20 and to eliminate the need for backwashing of the electrolytic filter.

The filtering system 100 can be used in chicken processing plants, cool cells on chicken houses, or on any recycled water to be reused. Any water to be reused, that has to be contaminate free, the three materials (copper, zinc and activated carbon) need to be used in a one-filter system (FIG. 7) or in a two-filters in-line system (FIG. 8).

It should be understood, of course, that the foregoing relates to exemplary embodiments of the invention and that modifications may be made without departing from the spirit and scope of the invention as set forth in the following claims.

What is claimed is:

1. A water filter system comprising:
a first tank forming a cavity for receiving a fluid and at least one filter material, wherein the first tank further comprises:
an intake opening configured for delivering an intake flow to the cavity; and
an outtake opening configured for delivering an outlet flow from the cavity via an outlet pipe;
a sealed chamber joined to the first tank so as to circumscribe the outtake opening; and
an outtake screen filter joined along a periphery of the outtake opening so the outtake screen filter forms a basket-shape extending into the cavity, forming a chamber space between the outtake screen filter and the sealed chamber;
wherein the at least one filter material comprises an electrolytic layer disposed between the intake opening and the outtake opening, and
wherein an ingress to the outlet pipe is disposed in the chamber space, inward from the outtake screen filter, whereby packing and clogging of the outlet pipe is avoided.

2. The water filter system of claim 1, wherein the at least one filter material further includes a carbon layer.

3. The water filter system of claim 1, further providing a fluid pump operably connected to an inlet for transmitting the fluid, wherein the inlet operably connects to the intake opening.

4. The water filter system of claim 3, further providing a backwashing sand filter operably connected between the fluid pump and the outtake opening.

5. The water filter system of claim 1, wherein the first tank is vertically oriented, and wherein the inlet extends into the cavity near a base end of the first tank.

6. The water filter system of claim 1, further including a screen filter for selectively covering the intake opening.

7. The water filter system of claim 1, wherein the electrolytic layer comprises a mixture of 55 percent copper granules and 45 percent zinc granules by volume.

8. The water filter system of claim 1, further including a bypass valve installed downstream of the pump to divert only a predetermined quantity of water through the intake opening.

9. A water filter system comprising:
a first tank and a second tank, each forming a cavity for receiving a fluid and at least one filter material, wherein each tank further comprises:
an intake opening configured for delivering an intake flow to the cavity; and
an outtake opening configured for delivering an outlet flow from the cavity via an outlet pipe,
a sealed chamber joined to the first tank so as to circumscribe the outtake opening; and an outtake screen filter joined along a periphery of the outtake opening so the outtake screen filter forms a basket-shape extending into the cavity, forming a chamber space between the outtake screen filter and the sealed chamber;

wherein an ingress to the outlet pipe is disposed in the chamber space, inward from the outtake screen filter;

wherein the at least one filter material received within the first tank comprises an electrolytic layer disposed between the intake opening and the outtake opening;

wherein the at least one filter material received within the second tank comprises a carbon layer disposed between the intake opening and the outtake opening; and wherein the intake opening of the second tank is operably connected to the outtake opening of the first tank, whereby packing and clogging of the outlet pipe is avoided.

10. The water filter system of claim 9, further providing a fluid pump operably connected to an inlet for transmitting the fluid, wherein the inlet operably connects to the intake opening of the first tank.

11. The water filter system of claim 10, further including further including a bypass valve installed downstream of the pump to divert only a predetermined quantity of water through the intake opening of the first tank.

12. The water filter system of claim 11, further providing a backwashing sand filter operably connected between the fluid pump and the outtake opening of the second tank.

13. The water filter system of claim 9, wherein the first tank and the second tank are vertically oriented, wherein the inlet extends into the cavity near a base end of the first tank, and wherein the second outtake opening is connected to a second outlet, wherein the second outlet extends into the into the cavity near a base end of the second tank.

14. A method of filtering the water from a water source, comprising the steps of:

providing a first tank forming a cavity for receiving a fluid and at least one filter material, wherein the first tank further comprises: an intake opening configured for delivering an intake flow to the cavity; and an outtake opening configured for delivering an outlet flow from the cavity via an outlet pipe; a sealed chamber joined to the first tank so as to circumscribe the outtake opening; and an outtake screen filter joined along a periphery of the outtake opening so the outtake screen filter forms a basket-shape extending into the cavity, forming a chamber space between the outtake screen filter and the sealed chamber, wherein the at least one filter material comprises an electrolytic layer disposed between the intake opening and the outtake opening;

interconnecting a pump between the water source and the intake opening; and operating the pump so as to urge an intake flow from the water source to the intake opening.

15. The method of claim 14, further including installing a bypass valve downstream of the pump for diverting only a predetermined quantity of intake flow through the intake opening.

16. The method of claim 15, further including installing a backwashing sand filter between the pump and the intake opening.

17. The method of claim 15, wherein the at least one filter material provides a carbon layer adjacent to the electrolytic layer.

18. The method of claim 16, further including installing a second tank operably interconnecting the outtake opening of the first tank, and wherein the at least one filter material within the second tank is a carbon layer.

19. The method of claim 15, further including connecting the outtake opening to a clean water source.

20. The method of claim 17, further including interconnecting the outtake opening back to the water source.

* * * * *